(12) United States Patent
Williams et al.

(10) Patent No.: US 7,764,155 B2
(45) Date of Patent: Jul. 27, 2010

(54) EXTRUDER SCREW WITH LONG WEARING SURFACES

(75) Inventors: Edward Williams, St. Louis, MO (US); Alan Eugene Kirkland, Crystal City, MO (US)

(73) Assignee: Good Earth Tools, Inc., Crystal City, MO (US)

( * ) Notice: Subject to any disclaimer, the term of this patent is extended or adjusted under 35 U.S.C. 154(b) by 0 days.

(21) Appl. No.: 12/419,649

(22) Filed: Apr. 7, 2009

(65) Prior Publication Data

US 2009/0268550 A1    Oct. 29, 2009

Related U.S. Application Data

(63) Continuation of application No. 11/122,707, filed on May 5, 2005, now Pat. No. 7,513,676.

(60) Provisional application No. 60/569,366, filed on May 8, 2004.

(51) Int. Cl.
  *B29B 7/58* (2006.01)
  *B21D 53/78* (2006.01)
(52) U.S. Cl. ......................................... 336/79; 29/889
(58) Field of Classification Search .................... 366/79, 366/318; 29/889, 445, 428, 460, 525.14; 228/156; 425/168, 204, 209
See application file for complete search history.

(56) References Cited

U.S. PATENT DOCUMENTS

| | | |
|---|---|---|
| 3,592,128 A | 7/1971 | French |
| 3,756,758 A | 9/1973 | Prall |
| 4,324,748 A | 4/1982 | Hatakeyama et al. |
| 4,470,790 A | 9/1984 | Harada et al. |
| 4,504,210 A | 3/1985 | Titz et al. |
| 4,514,348 A | 4/1985 | Iguchi et al. |
| 4,574,609 A | 3/1986 | Berecz |
| 4,687,433 A | 8/1987 | Ozaki et al. |
| 4,708,618 A | 11/1987 | Reifenhauser et al. |
| 4,752,196 A | 6/1988 | Wolfe, Jr. |
| 4,752,205 A | 6/1988 | Moriyama et al. |
| 4,806,086 A | 2/1989 | Bloch et al. |
| 4,856,974 A | 8/1989 | Wolfe, Jr. |
| 5,067,885 A | 11/1991 | Stevenson et al. |
| 5,110,276 A | 5/1992 | Farnsworth et al. |
| 5,135,378 A | 8/1992 | Catton |
| 5,238,385 A | 8/1993 | Johnson |
| 5,268,050 A | 12/1993 | Azari |
| 5,342,189 A | 8/1994 | Inamura et al. |
| 5,424,018 A | 6/1995 | Paul et al. |
| 5,609,600 A | 3/1997 | Love et al. |
| 5,718,926 A | 2/1998 | Dambrine et al. |
| 5,720,987 A | 2/1998 | Ploog |
| 5,762,975 A | 6/1998 | Rockstedt |
| 5,773,043 A | 6/1998 | Hunter |
| 5,855,963 A * | 1/1999 | Urbanek et al. .............. 427/448 |

(Continued)

*Primary Examiner*—John C Hong
(74) *Attorney, Agent, or Firm*—Storms LLP; Paul V. Storm, Esq.; Mark D. Perdue, Esq.

(57) ABSTRACT

A method of extending the life of an extruder screw by affixing tiles of wear-resistant material along the crest of the extruder screw flighting threads, and optionally grinding the hardened material to remove any sharp edges. In another configuration of the present invention, plates of wear-resistant material are secured to the leading edges of the extruder screw threads to further prolong the life of the extruder screw.

16 Claims, 2 Drawing Sheets

U.S. PATENT DOCUMENTS

| | | |
|---|---|---|
| 5,968,603 A * | 10/1999 | Urbanek et al. .............. 427/448 |
| 6,019,924 A | 2/2000 | Montalbano |
| 6,179,461 B1 | 1/2001 | Christiano et al. |
| 6,196,823 B1 | 3/2001 | Coyle et al. |
| RE37,235 E | 6/2001 | Hauck et al. |
| 6,244,849 B1 | 6/2001 | Bailey et al. |
| 6,296,468 B1 | 10/2001 | Deutsch et al. |
| 6,346,293 B1 | 2/2002 | Douris et al. |
| 6,352,426 B1 | 3/2002 | Hutchinson et al. |
| 6,497,713 B1 | 12/2002 | Tompkins et al. |
| 6,511,309 B1 | 1/2003 | Hunter |
| 6,634,781 B2 * | 10/2003 | Bowens et al. ................. 366/79 |
| 6,786,630 B2 * | 9/2004 | Haberer ....................... 366/79 |

* cited by examiner

EXTRUDER SCREW WITH LONG WEARING SURFACES

CLAIM OF PRIORITY

This application is a continuation of U.S. Nonprovisional patent application Ser. No. 11/122,707 filed on May 5, 2005, now U.S. Pat. No. 7,513,676 issued on Apr. 7, 2009, which claims priority from U.S. Provisional Patent Application No. 60/569,366 entitled "EXTRUDER SCREW WITH LONG WEARING SURFACES" filed on May 8, 2004, which are incorporated herein by reference for all purposes.

CROSS-REFERENCE TO RELATED APPLICATION

This application is also related to U.S. patent application Ser. No. 11/122,664, entitled "DIE FOR EXTRUDED MATERIALS," filed May 5, 2005, on behalf of Edward Williams, now U.S. Pat. No. 7,316,667 issued on Jan. 8, 2008, which is incorporated by references for all purposes.

TECHNICAL FIELD

The invention relates generally to extrusion equipment, more particularly to extrusion screws, and most particularly to extrusion screws that have been modified for extended wear and durability.

BACKGROUND

Extrusion is a well-known process that is used in many industries. A variety of products from foods to optical fibers, plastics and metals are produced by extrusion. In the extrusion process, the materials to be extruded are fed into the extruder, a type of giant mixer. The materials are mixed, heated if appropriate, and fed into a barrel that contains an internal rotating screw. The screw moves the liquid or viscous material being extruded (the "extrudate"), out the end of the extruder, through a die having the shape of the desired product. The extrudate will take the shape into which it is formed coming out through the extruder die. The extrudate is generally continuous, and is often cut into desired lengths after being extruded out the die. Extrudate is formed into an almost infinite variety of shapes, ranging from tubes to sheet material.

It has been found that the outside edges of the screw threads in the extruder, which mix the extrudate and push it out the end of the extrusion barrel, tend to be more subject to wear than other parts of the screw threads. When the outside edges of the screw threads wear sufficiently, extrudate flows between the screw threads and the barrel, which interferes with the normal extrusion process. To this end, steps have been taken to extend the durability on those parts of the screws that see additional wear. Such steps have included applying a coating of various liquid substances that harden on the screw or applying an additional layer of solid wear-resistant material to the portions of the extruder screw subject to wear. However, it has been found that materials that project out from the surface of the screw are subject to shear during use, and the materials can experience fatigue cracks. Subsequently, pieces of the material can break off and end up being incorporated in the extrudate being mixed. Often this necessitates the disposal of batches of extrudate which are contaminated with pieces of wear-resistant material or coating.

Another solution has been to cut grooves in the crests of the extruder screw threads, and insert other materials, such as molybdenum, in those grooves, as shown in U.S. Pat. No. 5,135,378 to Catton ("Catton"). The Catton process is, however, very complex, involving cutting a groove, laying in a first material along the sides and at intervals as bridges across the width of the groove, then laying in a second material in a liquid state that hardens to form a mechanical bond with the extruder screw. The added material is then ground to form a smooth surface.

Another solution, as disclosed in U.S. Pat. No. 6,346,293 to Douris et al. ("Douris"), is to weld a bead of a hardened material along part of the width of the crest of the extruder screw threads, and then weld beads of a different hardened material along either side of the first bead of hardened material. Subsequently, the hardened materials are ground to the required tolerances. Because of the many steps involved in welding two separate materials to the crest of the screw, because of the need for the materials that will bond to each other as well as to the screw thread, and because of the grinding the hardened material, the process is very involved and time consuming. Thus, the Douris process is rather expensive.

Therefore, a method and/or apparatus for extending the life of extruder screws is needed by making them more resistant to wear wherein the method does not compromise the structural integrity of the screw, nor produce fragments that contaminates the extrudate, and is not overly complex, involved or expensive.

SUMMARY

The present invention, accordingly, provides a method of applying a plurality of tiles to a flighting crest of at least one thread of an extruder screw. A groove is formed along the crest. Each tile is then inserted into the groove, wherein the tiles are in a spaced-apart arrangement. The tiles are then secured into the groove. In one preferred embodiment of the present invention, the groove is formed in the extruder screw when the extruder screw threads are cast. In yet another preferred embodiment of the present invention, the groove is cut into the crest after the extruder screw has been cast. In yet another alternative embodiment of the present invention, the tiles are further ground to remove any protruding edges and to fit within the tolerances of an extruder barrel. Another alternative embodiment of the present invention further comprises inserting a spacer into spaces between the tiles; and securing the spacers.

In another preferred embodiment of the present invention, plates of a wear-resistant material are secured to at least one leading edge of the extruder screw threads in a spaced-apart arrangement.

In one embodiment of the present invention, the tiles are made of carbide or tungsten-carbide. In another preferred embodiment of the present invention, the step of securing further comprises brazing, soldering, or gluing.

Additionally, the present invention also provides an apparatus for extruding. An extruding screw having at least one thread with a crest and having a groove formed therein is provided. Also, there are a plurality of tiles formed of a hardened materials secured within the groove in a spaced-apart arrangement. In an alternative embodiment of the present invention, the hardened material is carbide or tungsten-carbide. In another alternative embodiment of the present invention the tiles are secured by brazing, soldering, or gluing. In another preferred embodiment of the present invention, spacers secured between the tiles.

Additionally, in yet another preferred embodiment of the present invention, a plurality of plates made of the hardened material is secured to the crest in a spaced-apart arrangement.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
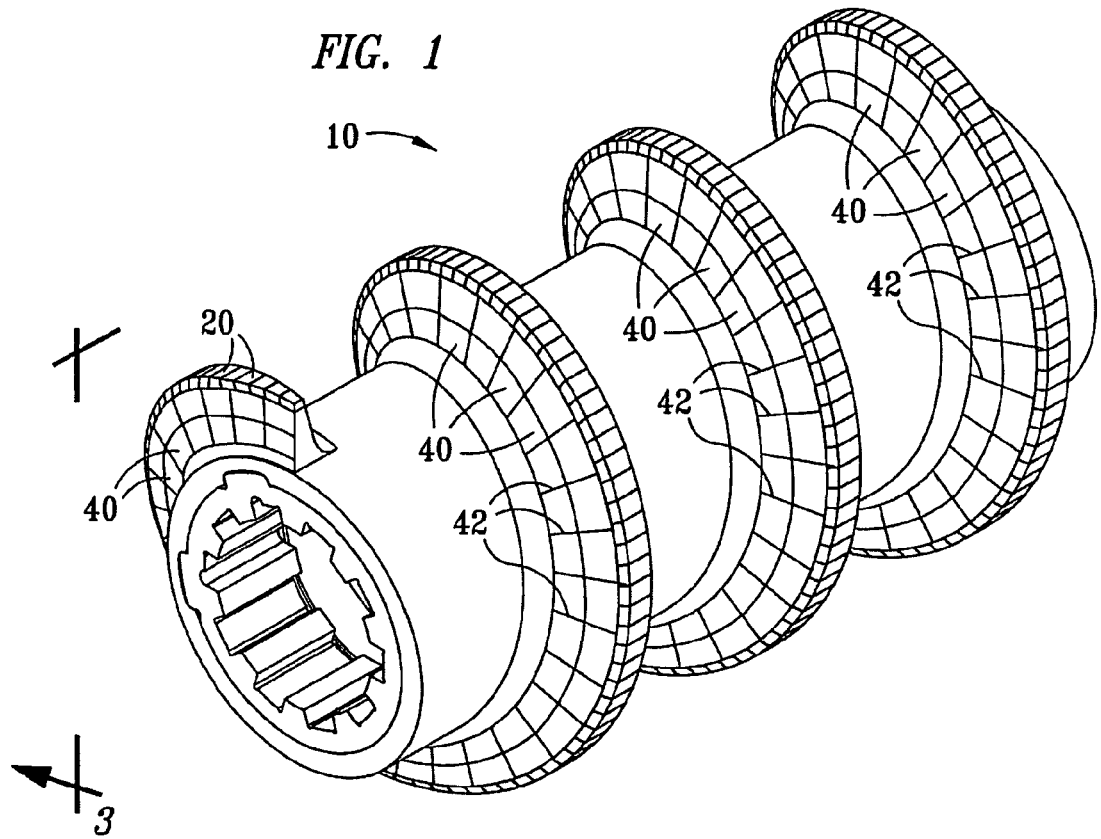
FIG. 1 is a perspective view of an extruder screw embodying the features of the present invention.

In the discussion of the FIGURES the same reference numerals will be used throughout to refer to the same or similar components. In the interest of conciseness, various other components known to the art, such as extrusion devices and extruder die plates have not been shown or discussed.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details not considered necessary to obtain a complete understanding of the present invention have been omitted, in as much as such details are considered to be within the skills of persons of ordinary skill in the relevant art.

Figure 2:
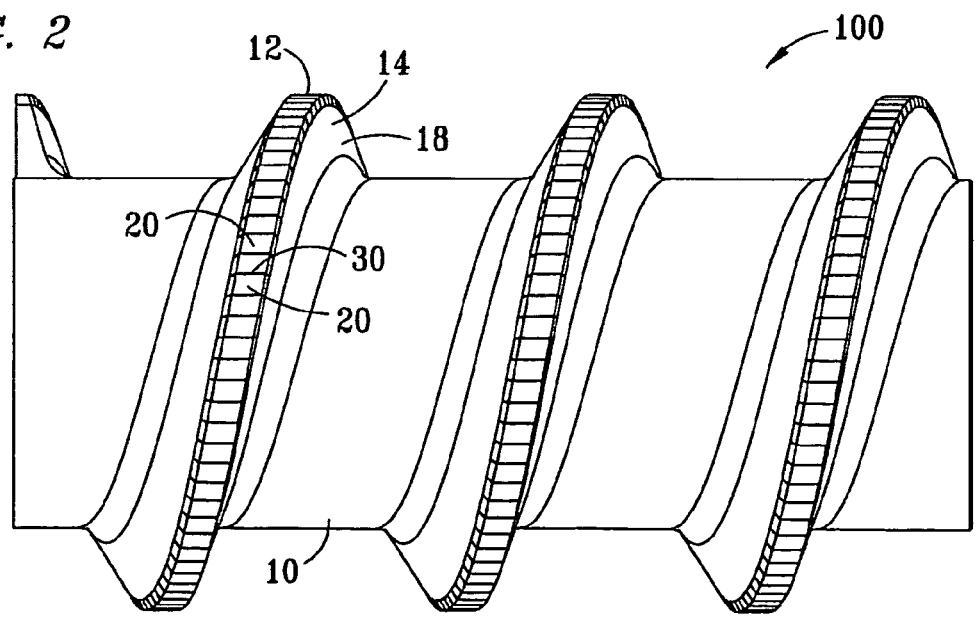
FIG. 2 is a side view of an extruder screw embodying the features of the present invention.
Figure 3:
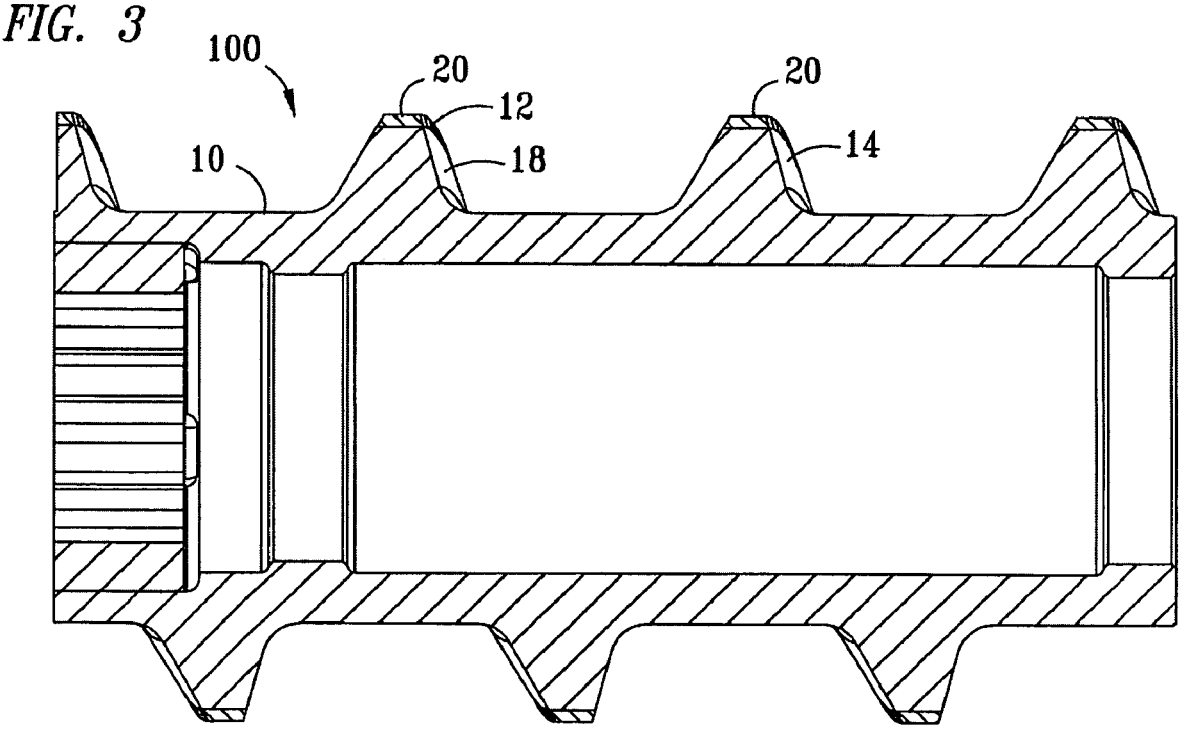
FIG. 3 is an enlarged cross-sectional view of a portion of an extruder screw taken along line 3-3 of FIG. 2.

Referring to FIGS. 1-3 of the drawings, the reference numeral 100 generally designates an extruder screw of the present invention. The system 100 includes a cast screw 10 and tiles 20. The tiles 20 are typically made of carbide, tungsten-carbide, or some other hard, long-wearing material, and the cast screw is made of a cast metal or allow, such as steel.

As can be seen in FIG. 1, the wear-resistant layer is comprised of a series of tiles 20 spaced slightly apart from each adjoining tile 20, rather than from a single piece of material. The purpose of spaced-apart tiles 20 is to provide sufficient flexibility so that the tiles 20 can move slightly in relation to each other and the screw 10, and therefore withstand shear and fatigue cracking that can occur when the extruder screw is moving extrudate through the extruder. Thus, this spacing and the resulting ability of the tiles 20 to move slightly prevents damage to the tiles 20 that results in pieces of the tiles 20 being broken off and falling into the extrudate.

In one arrangement of the present invention, generally flat tiles 20 are affixed to the length of the flighting crest 12 of the threads 14 of the extruder screw 10. The tiles 20 are generally brazed, soldered, or glued to the flighting crest 12 of the extruder screw threads 14. Preferably, as can be seen in FIG. 1, some of the tiles 40 bonded to the leading face 18 of the extruder screw threads 14 have an edge that is generally coextensive with the flighting crest 12.

In another arrangement of the present invention, the tiles 20 have a generally flat upper surface, and a tapered base (not shown). The tapered base portion (not shown) of the tiles 20 fit into a groove (not shown) that has been cut or cast into the flighting crest 12 in the screw threads 14. The tiles 20 are generally brazed, soldered, or glued into the groove 16 in the flighting crest 12.

In another embodiment of the present invention, as seen in FIG. 1, thin plates of a hardened material 40 are affixed to the leading edge 18 of the screw 10. Preferably, the plates 40 are bonded to the leading edge 18 of the screw 10. Some examples of bonding are brazing, soldering, or gluing. The plates 40 are spaced slightly apart from one another, rather than a single piece of material being affixed to the leading edge 18 of the screw 10. The spaced-apart plates 40 should be sufficiently close to each other so as to provide a generally continuous surface across the leading face 18 and flighting crest 12 of the thread. The purpose of spaced-apart plates 40 is to provide sufficient flexibility so that the plates 40 can move slightly in relation to each other, and therefore withstand shear and fatigue cracking that can occur when the extruder screw is moving extrudate through the extruder. This spacing, and the resulting ability of the plates 40 to move slightly, prevents damage to the plates 40 that results in pieces of the plates 40 being broken off and falling into the extrudate. In some arrangements of the present invention, spacers 42 are inserted into the spaces between the plates 40. These spacers 42 are typically made of a soft material, such as copper, that will move in response to movement of the plates 40 and/or the screw 10, and preferably have a different expansion and contraction rate than the screw 10 or the plates 40 for increased flexibility. If necessary, the plates 40 can be ground to achieve a smooth surface of the desired dimensions.

As can be seen in FIG. 2, some arrangements of the present invention also employ spacers 30 in conjunction with the tiles 20 used along the flighting crest 12. Spacers 30 are inserted into the spaces between the tiles 20. These spacers 30 are typically made of a soft material, such as copper, that will move in response to movement of the tiles 20 and/or the screw 10, and preferably have a different expansion and contraction rate than the screw 10 or the tiles 20 for increased flexibility.

After the tiles 20, and if used, spacers 30, have been affixed to the extruder screw flighting crest 12, they can be ground and polished to fit the tolerances of the extruder.

FIG. 3 shows a cross-section of an extruder screw 100 of the present invention after tiles 20 have been secured to the extruder screw flighting crest 12 and been ground to tolerance.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An extruder screw, comprising:
   a shaft;
   a flight extending helically about the shaft, the flight having a leading face, a trailing face, and a crest, and the crest being generally coaxial with the shaft;
   a plurality of rows of wear-resistant tiles, each tile having a wear surface and an opposite binding surface, and each tile having a plurality of edges, wherein the binding surface of each tile is configured to be secured to the flight;
   a first row of tiles that are secured to the leading face of the flight, wherein at least one edge of each tile in the first row is generally aligned with the crest of the flight; and
   a second row of tiles that are secured to the crest of the flight, wherein at least one edge of each tile in the second row is generally aligned with the wear surface of at least one tile in the first row.

2. The extruder screw of claim 1 wherein the tiles are brazed to the flight.

3. The extruder screw of claim 1 wherein the tiles are made of tungsten-carbide.

4. The extruder screw of claim 1 wherein the first set of wear-resistant tiles is arranged with the tiles substantially flush to one another so as to form a substantially continuous wear-resistant surface.

5. The extruder screw of claim 1 wherein the second set of tiles is arranged with the tiles substantially flush to one another so as to form a substantially continuous wear-resistant surface.

6. The extruder screw of claim 1 further comprising a plurality of spacers secured to the flight, between the tiles.

7. The extruder screw of claim 6 wherein the spacers are brazed to the flight.

8. The extruder screw of claim 1 wherein the tiles are made of tungsten-carbide.

9. An extruder screw, comprising:
   a generally cylindrical shaft;
   at least one flight extending helically about the shaft, the flight having a leading face, a trailing face, and a crest, and the crest being concentric with a periphery of the shaft;
   a plurality of wear-resistant tiles, each tile having a wear surface and an opposite binding surface, and each tile having a plurality of edges, wherein the binding surface is configured to be secured to the flight;
   a first plurality of tiles secured to the leading face of the thread flight, wherein at least one edge of the tiles is adjacent an edge of the crest and is generally aligned with the edge of the crest; and
   a second plurality of tiles secured to the crest of the flight, wherein at least one edge of each tile in the second plurality of tiles is adjacent the wear surface of at least one tile in the first plurality of tiles.

10. The extruder screw of claim 9 wherein the tiles are brazed to the flight.

11. The extruder screw of claim 9 wherein the tiles are made of tungsten-carbide.

12. The extruder screw of claim 9 wherein the first set of tiles is arranged with the tiles substantially flush to one another so as to form a substantially continuous wear-resistant surface.

13. The extruder screw of claim 9 wherein the second set of tiles is arranged with the tiles substantially flush to one another so as to form a substantially continuous wear-resistant surface.

14. The extruder screw of claim 9 further comprising a plurality of spacers secured to the flight, between the tiles.

15. The extruder screw of claim 14 wherein the spacers are brazed to the flight.

16. The extruder screw of claim 9 wherein the tiles are made of tungsten-carbide.

* * * * *